(12) United States Patent
Choi et al.

(10) Patent No.: US 12,467,536 B2
(45) Date of Patent: *Nov. 11, 2025

(54) BRAKE DEVICE FOR VEHICLE

(71) Applicant: HYUNDAI MOBIS CO., LTD., Seoul (KR)

(72) Inventors: Byeong Jin Choi, Yongin-si (KR); Chang Hoe Koo, Yongin-si (KR); Byung Jun Kim, Yongin-si (KR); Si Yoon Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 312 days.

This patent is subject to a terminal disclaimer.

(21) Appl. No.: 18/068,368

(22) Filed: Dec. 19, 2022

(65) Prior Publication Data

US 2023/0415719 A1 Dec. 28, 2023

(30) Foreign Application Priority Data

Jun. 27, 2022 (KR) .................. 10-2022-0078142

(51) Int. Cl.
*F16J 10/04* (2006.01)
*B60T 13/16* (2006.01)
*B60T 13/74* (2006.01)

(52) U.S. Cl.
CPC .............. *F16J 10/04* (2013.01); *B60T 13/16* (2013.01); *B60T 13/745* (2013.01)

(58) Field of Classification Search
CPC .......... B60T 13/16; B60T 13/745; F16J 10/04
See application file for complete search history.

(56) References Cited

U.S. PATENT DOCUMENTS

| | | | | |
|---|---|---|---|---|
| 6,053,289 A | * | 4/2000 | Bauer | F16D 65/567 188/71.9 |
| 8,997,947 B2 | * | 4/2015 | Shiraki | F16D 65/38 188/156 |

(Continued)

FOREIGN PATENT DOCUMENTS

| | | | |
|---|---|---|---|
| DE | 4229042 A1 | 3/1993 | |
| DE | 102019219409 A1 * | 6/2021 | ............ B60T 13/745 |

(Continued)

OTHER PUBLICATIONS

DE102019219409A1_t machine translation thereof (Year: 2021).*

(Continued)

*Primary Examiner* — Matthew Wiblin
(74) *Attorney, Agent, or Firm* — NovoTechIP International PLLC (57) ABSTRACT

A brake device for a vehicle includes a housing unit, a cylinder unit installed inside the housing unit, a motor unit connected to the cylinder unit and provides a rotational force, a screw shaft provided inside the cylinder unit and axially rotated by receiving the rotational force of the motor unit, a nut unit coupled to the screw shaft through a ball member and reciprocated in an axial direction of the screw shaft according to a rotation direction of the screw shaft, a piston unit coupled to the nut unit and moving in conjunction with the nut unit, and a bearing unit provided inside the cylinder unit, coupled to the screw shaft, and supporting an axial load when forming hydraulic pressure of the cylinder unit.

15 Claims, 7 Drawing Sheets

(56) References Cited

U.S. PATENT DOCUMENTS

| | | | |
|---|---|---|---|
| 9,003,903 B2 | 4/2015 | Drumm | |
| 10,295,004 B2* | 5/2019 | Chelaidite | F16D 65/12 |
| 10,875,516 B2* | 12/2020 | Lee | B60T 13/745 |
| 11,999,327 B2* | 6/2024 | Park | B60T 13/745 |
| 2012/0017756 A1* | 1/2012 | Bidare | F16H 55/22 |
| | | | 92/3 |
| 2018/0009425 A1* | 1/2018 | Feigel | B60T 13/145 |
| 2019/0100182 A1* | 4/2019 | Leiber | B60T 13/142 |
| 2020/0208698 A1* | 7/2020 | Kim | F16D 65/18 |
| 2024/0149852 A1* | 5/2024 | Park | F15B 15/14 |

FOREIGN PATENT DOCUMENTS

| | | | |
|---|---|---|---|
| KR | 10-2017-0008093 A | 1/2017 |
| KR | 10-2019-0037942 A | 4/2019 |
| KR | 10-2020-0142289 A | 12/2020 |
| WO | 2018/023091 A1 | 2/2018 |
| WO | 2019/194143 A1 | 10/2019 |
| WO | 2019/214835 A1 | 11/2019 |

OTHER PUBLICATIONS

Office Action issued on Jan. 17, 2024 in the corresponding Korean Patent Application No. 10-2022-0078142.

Extended European Search Report issued on Jun. 27, 2023 in the corresponding European Patent Application No. 22214565.8.

\* cited by examiner

BRAKE DEVICE FOR VEHICLE

CROSS-REFERENCE TO RELATED APPLICATION

This application claims priority from Korean Patent Applications No. 10-2022-0078142, filed on Jun. 27, 2022, which is hereby incorporated by reference for all purposes as set forth herein.

BACKGROUND

Technical Field

Exemplary embodiments of the present disclosure relate to a brake device for a vehicle, and more particularly, a brake device for a vehicle in which an axial load caused by hydraulic pressure is not transmitted to a motor.

Discussion of the Background

In general, due to the nature of an electric brake device for a vehicle, a device for generating braking hydraulic pressure by converting rotational motion of a motor to a linear motion of a piston inside a cylinder is required.

In the related art, the motor supports an axial load caused by hydraulic reaction force of the cylinder. Since sufficient rigidity is ensured for the motor to support the axial load, there is a problem of increasing a size and weight of a motor housing and a bearing.

In addition, assembly single products that compensate for a coaxiality and perpendicularity of a power shaft that exists separately act as a factor for increasing quality management area, and there is a problem that it is disadvantageous to reduce an axial length of a power transmission structure. Therefore, there is a need to improve this issue.

SUMMARY

An object of the present disclosure devised to solve the above problems is to provide a brake device for a vehicle capable of supporting an axial load in a cylinder when hydraulic pressure is formed.

Another object of the present disclosure is to provide the brake device for a vehicle in which the axial load due to hydraulic pressure is not transmitted to a motor.

Another object of the present disclosure is to provide the brake device for a vehicle that can omit or replace existing axial alignment assembly parts using right angle and concentric compensation using an own gap of a bearing.

The present disclosure devised to achieve the above problem is a brake device for a vehicle, which may include a housing unit, a cylinder unit installed inside the housing unit, a motor unit connected to the cylinder unit and providing a rotational force, a screw shaft provided inside the cylinder unit and axially rotated by receiving the rotational force of the motor unit, a nut unit coupled to the screw shaft through a ball member and reciprocates in an axial direction of the screw shaft according to a rotation direction of the screw shaft, a piston unit coupled to the nut unit and moving in conjunction with the nut unit, and a bearing unit provided inside the cylinder unit, coupled to the screw shaft, and supporting an axial load when forming hydraulic pressure of the cylinder unit.

The brake device for a vehicle may include a sleeve unit provided inside the cylinder unit and guiding the piston unit to be inserted and moved.

A port for moving a working oil may be formed on an outer surface of the cylinder unit, and a cut-off hole portion is formed on an outer surface of the sleeve unit to communicate with the port.

The cylinder unit may form a double-acting hydraulic pressure according to a reciprocating movement of the piston unit.

The piston unit may include a rod unit spirally coupled to an outer surface of the nut unit and a head unit integrally formed with the rod unit and reciprocated in a longitudinal direction of the sleeve unit inside the sleeve unit.

The brake device for a vehicle may further include a guide unit provided inside the cylinder unit and restraining a rotation of the nut unit and guiding a linear movement of the nut unit.

The guide unit may be integrally molded into the cylinder unit or the nut unit.

The guide unit may include a first guide protrusion portion protruding from an inner surface of the cylinder unit and a first guide groove portion recessed in an outer surface of the nut unit to correspond to the first guide protrusion portion, and the nut unit is moved in a straight line along the first guide protrusion portion.

The guide unit may include a second guide groove portion recessed in an inner surface of the cylinder unit and a second guide protrusion portion protruding from an outer surface of the nut unit to correspond to the second guide groove portion, and the nut unit is moved in a straight line along the second guide groove portion.

The guide unit may include a guide member inserted between the cylinder unit and the nut unit, and guides a linear movement of the nut unit by restraining a rotation of the nut unit.

The guide unit may include a third guide groove portion recessed in an inner surface of the cylinder unit and a fourth guide groove portion recessed in an outer surface of the nut unit to correspond to the third guide groove portion, and the guide member is positioned between the third guide groove portion and the fourth guide groove portion.

The motor unit may include a fixing unit fixed to the housing unit and changed a magnetic force thereof by supplying power; a motor rotation unit connected to the screw shaft, rotated with the screw shaft, and rotated according to a magnetic force change of the fixing unit; and a motor bearing unit installed between the fixing unit and the motor rotation unit to reduce friction generated when the motor rotation unit is rotated.

The motor rotation unit may include a rotating frame that is rotatably installed inside the fixing unit and installed in a shape surrounding one side of the cylinder unit, and a rotor installed on an outer surface of the rotating frame facing the fixing unit and equipped with magnetic force.

The screw shaft may include a body portion, which is rotatably installed inside the cylinder unit and has a spiral gear formed on an outer surface of body portion; a first coupling portion extending to one side from the body portion and spline-coupled to the rotating frame; and a second coupling portion extending from the body portion to the other side and rotatably coupled to the bearing unit.

The screw shaft may further include a support unit is provided inside the cylinder unit, accommodates an end portion of the second coupling portion, and rotatably supports the screw shaft.

The present disclosure may support an axial load in the bearing unit assembled to the cylinder unit when hydraulic pressure is formed, so that the axial load due to hydraulic pressure is not transmitted to the motor unit.

In addition, since the present disclosure does not support the axial load in the motor unit, weight and size of the housing unit and the bearing unit may be reduced.

In addition, the present disclosure may reduce cost and an axial length by omitting or replacing existing axial alignment assembly single products using right angle and concentric compensation using an own gap of the bearing unit.

DETAILED DESCRIPTION OF THE ILLUSTRATED EMBODIMENTS

Hereinafter, a brake device for a vehicle will be described below with reference to the accompanying drawings through various exemplary embodiments. For clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, definitions of these terms should be defined in light of details disclosed throughout the present specification.

Figure 1:
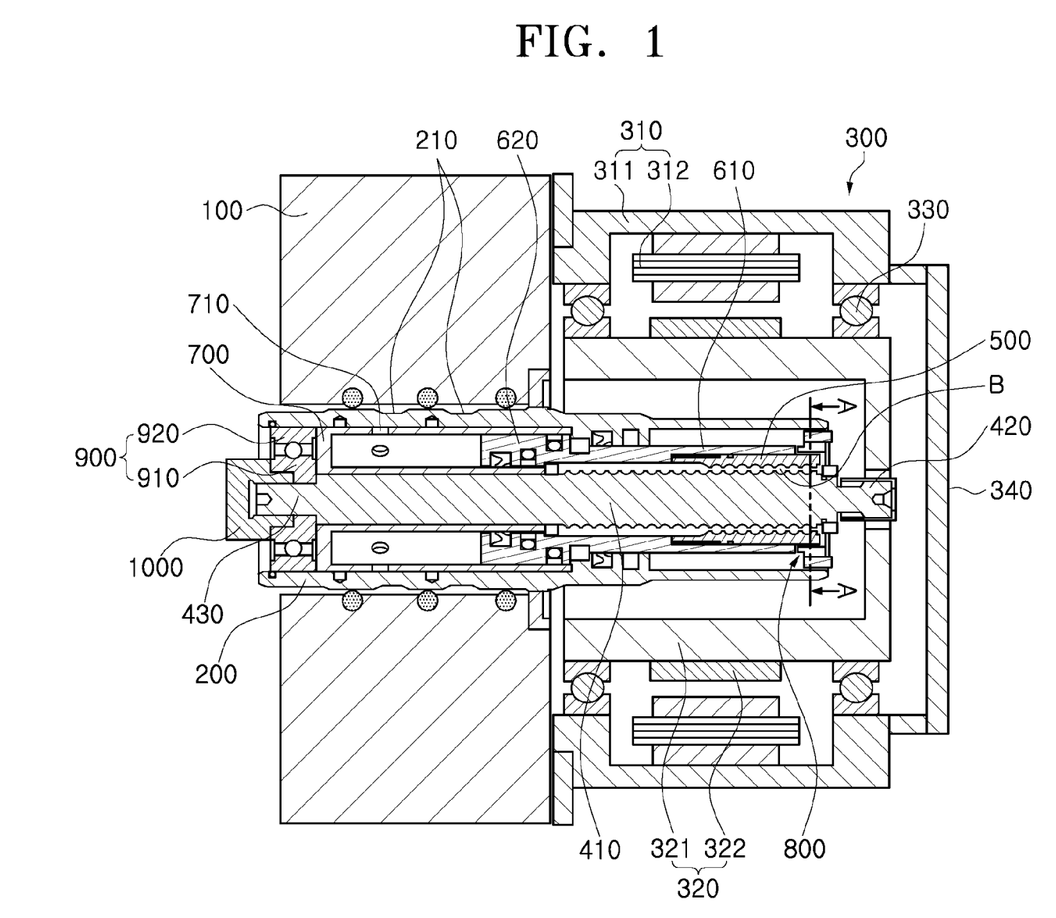
FIG. 1 is a cross-sectional view illustrating a brake device for a vehicle according to an embodiment of the present disclosure.

FIG. 1 is a cross-sectional view illustrating a brake device for a vehicle according to an embodiment of the present disclosure.

Referring to FIG. 1, a brake device for a vehicle according to an embodiment of the present disclosure includes a housing unit 100, a cylinder unit 200, a motor unit 300, a screw shaft 400, a nut unit 500, a piston unit 600, and a bearing unit 900. In addition, the brake device for a vehicle according to the present embodiment may further include a sleeve unit 700, a guide unit 800, and a support unit 1000.

The housing unit 100 is formed in the shape of a hollow in which an inner space is provided.

The cylinder unit 200 is disposed in an inner space of the housing unit 100. The cylinder unit 200 is installed by being pressed into the housing unit 100 so that the cylinder unit 200 may support torque generated when hydraulic pressure is formed due to the reciprocating movement of the piston unit 600. The cylinder unit 200 may be assembled to regulate concentricity in the housing unit 100.

The cylinder unit 200 is formed in the shape of a hollow. One side space inside the cylinder unit 200 (left side based on FIG. 1), the sleeve unit 700 having an operation section inside thereof is disposed in such a manner that hydraulic pressure is formed by pressure of the piston unit 600.

The sleeve unit 700 is disposed inside the cylinder unit 200. The piston unit 600 may be inserted into an inner space of the sleeve unit 700 to guide movement by the sleeve unit 700 during reciprocating movement.

The sleeve unit 700 may be formed to surround a head unit 620 of the piston unit 600. Accordingly, the sleeve unit 700 may serve to guide the movement of the piston unit 600.

The sleeve unit 700 has a cut-off hole portion 710 formed on an outer surface thereof. A plurality of the cut-off hole portions 710 may be formed along a circumferential direction of the sleeve unit 700. A working oil inside the sleeve unit 700 may be discharged to outside of the sleeve unit 700 through the cut-off hole portion 710.

A cylinder port 210 for moving the working oil is formed on an outer surface of the cylinder unit 200. A plurality of cylinder ports 210 may be formed along the length direction of the cylinder unit 200. At least one or more of the plurality of cylinder ports 210 may be disposed to face the cut-off hole portion 710 of the sleeve unit 700.

The working oil which is moved by the reciprocating movement of the piston unit 600 is moved through the cylinder port 210 to realize a required braking pressure.

The cut-off hole portion 710 is formed to communicate with the cylinder port 210. Accordingly, the working oil of the sleeve unit 700 may be discharged in a radial direction of the piston unit 600.

The motor unit 300 transmits a rotational force (torque) to the screw shaft 400. The motor unit 300 may be connected to the cylinder unit 200 and various types of driving devices may be used in the technical idea of supplying rotational force to the screw shaft 400.

The motor unit 300 may include a fixing unit 310, a motor rotation unit 320, and a motor bearing unit 330.

The fixing unit 310 is fixed to the housing unit 100 and may be formed in various shapes within the technical idea that a magnetic force is changed by supplying power. The fixing unit 310 may include a fixed frame 311 fixed to the housing unit 100, and a stator 312 generating a magnetic force and installed on the inner surface of the fixed frame 311 facing the motor rotation unit 320.

The fixed frame 311 is connected to the housing unit 100, and the motor rotation unit 320 is rotatably disposed inside the fixed frame 311. In addition, the stator 312 is disposed in a circumferential direction on the inner surface of the fixed frame 311, and magnetic flux is changed by a control signal of a control unit (not illustrated) and rotates the motor rotation unit 320. The stator 312 may be an electromagnet.

The motor rotation unit 320 is connected to the screw shaft 400, rotates with the screw shaft 400, and may be transformed into various shapes in the technical idea of rotating according to a magnetic force change of the fixing unit 310.

The motor rotation unit 320 is rotatably installed inside the fixed frame 311. The motor rotation unit 320 may include a rotating frame 321 surrounding a portion of the cylinder unit 200 (right side based on FIG. 1) and a rotor 322 disposed on the outer surface of the rotating frame 321 and facing the fixing unit 310.

A cross section of the motor rotation unit 320 (based on FIG. 1) is formed in a "[" shape and is formed in a hollow shape.

The motor bearing unit 330 may be disposed between the fixing unit 310 and the motor rotation unit 320. Friction generated when the motor rotation unit 320 is rotated by an arrangement of the motor bearing unit 330 is reduced. The rotor 322 may be a magnet. The rotor 322 disposed in the circumferential direction of the rotating frame 321 is rotated together with the rotating frame 321 by a change of magnetic force of the stator 312.

The motor unit 300 may further include a cover member 340. The cover member 340 is fixed to the fixed frame 311 to surround outside of an end portion of the rotating frame 321 and blocks an inflow of foreign substances.

The screw shaft 400 is disposed inside the cylinder unit 200. The screw shaft 400 is inserted in a longitudinal direction of the cylinder unit 200 and is axially coupled to the cylinder unit 200. A central axis of the cylinder unit 200 and a central axis of the screw shaft 400 coincide with each other.

The screw shaft 400 includes a body portion 410, a first coupling portion 420, and a second coupling portion 430. The screw shaft 400 is fixed to a bearing unit 900 to be described later as the support unit 1000.

The body portion 410 is rotatably disposed inside the cylinder unit 200, and a spiral gear is formed on the outer circumferential surface in the longitudinal direction of the screw shaft 400. The body portion 410 is disposed inside the rotating frame 321.

The first coupling portion 420 extends from an outer surface of the center of rotation of the body portion 410 to one side (right side based on FIG. 1) and has an outer diameter smaller than the outer diameter of the body portion 410. A spline portion is formed along the circumferential direction on an outer surface of the first coupling portion 420 facing the rotating frame 321. Accordingly, since the rotating frame 321 and the screw shaft 400 are spline-coupled together, power is transmitted between the rotating frame 321 and the screw shaft 400.

The second coupling portion 430 extends from the outer side of the center of rotation of the body portion 410 to the other side (left side based on FIG. 1) and has an outer diameter smaller than that of the body portion 410. The second coupling portion 430 is rotatably coupled through the bearing unit 900.

The nut unit 500 is disposed inside the rotating frame 321. The nut unit 500 is disposed inside the cylinder unit 200 and is disposed on an outer surface of the screw shaft 400. A ball member B is disposed between the inner circumferential surface of the nut unit 500 and the outer circumferential surface of the screw shaft 400.

The nut unit 500 is coupled through the screw shaft 400, and the ball member B is provided between the inner surface of the nut unit 500 and the spiral gear formed on the outer surface of the body portion 410 of the screw shaft 400, and then a rotational motion of the screw shaft 400 may be converted into a linear motion through the nut unit 500. That is, the nut unit 500 reciprocates in the axial direction of the screw shaft 400 according to the rotational direction of the screw shaft 400.

A flange unit 510 may be formed at one end portion (right side based on FIG. 1) of the nut unit 500 facing the motor unit 300. The flange unit 510 is formed in the circumferential direction of the nut unit 500 and protrudes in the axial direction of the nut unit 500.

The piston unit 600 is coupled in a shape surrounding the outer side of the nut unit 500. The piston unit 600 moves in the longitudinal direction of the cylinder unit 200 in conjunction with the nut unit 500. The piston unit 600 may include a rod unit 610 and a head unit 620.

The rod unit 610 is formed in a hollow shape and is located inside the rotating frame 321 provided in the motor unit 300. An outer surface of the nut unit 500 and an inner surface of the rod unit 610 are spirally coupled. The head unit 620 may be integrally formed with the rod unit 610. A diameter of the head unit 620 may be formed to be larger than a diameter of the rod unit 610.

The head unit 620 is formed in a ring shape and is located inside the housing unit 100 and reciprocates inside the sleeve unit 700 to move the working oil of inside the sleeve unit 700 in the direction toward the cylinder port 210. Accordingly, the cylinder unit 200 forms a double-acting hydraulic pressure according to the reciprocating movement of the piston unit 600.

The guide unit 800 is provided inside the cylinder unit 200. The guide unit 800 constrains the rotation of the nut unit 500 and serves to guide a linear movement of the nut unit 500.

The guide unit 800 constrains the rotation of the nut unit 500 so that the nut unit 500, which is moved along the screw shaft 400 by a reverse or forward rotation of the screw shaft 400, is not rotated in the rotation direction of the screw shaft 400, and the guide unit 800 guides the movement of the nut unit 500 so that the nut unit 500 moves in a straight line in the axial direction of the screw shaft.

The guide unit 800 may be integrally molded with the cylinder unit 200 or the nut unit 500. In other words, the guide unit 800 may be formed by processing an inner surface of the cylinder unit 200 or an outer surface of the nut unit 500.

Figure 2:
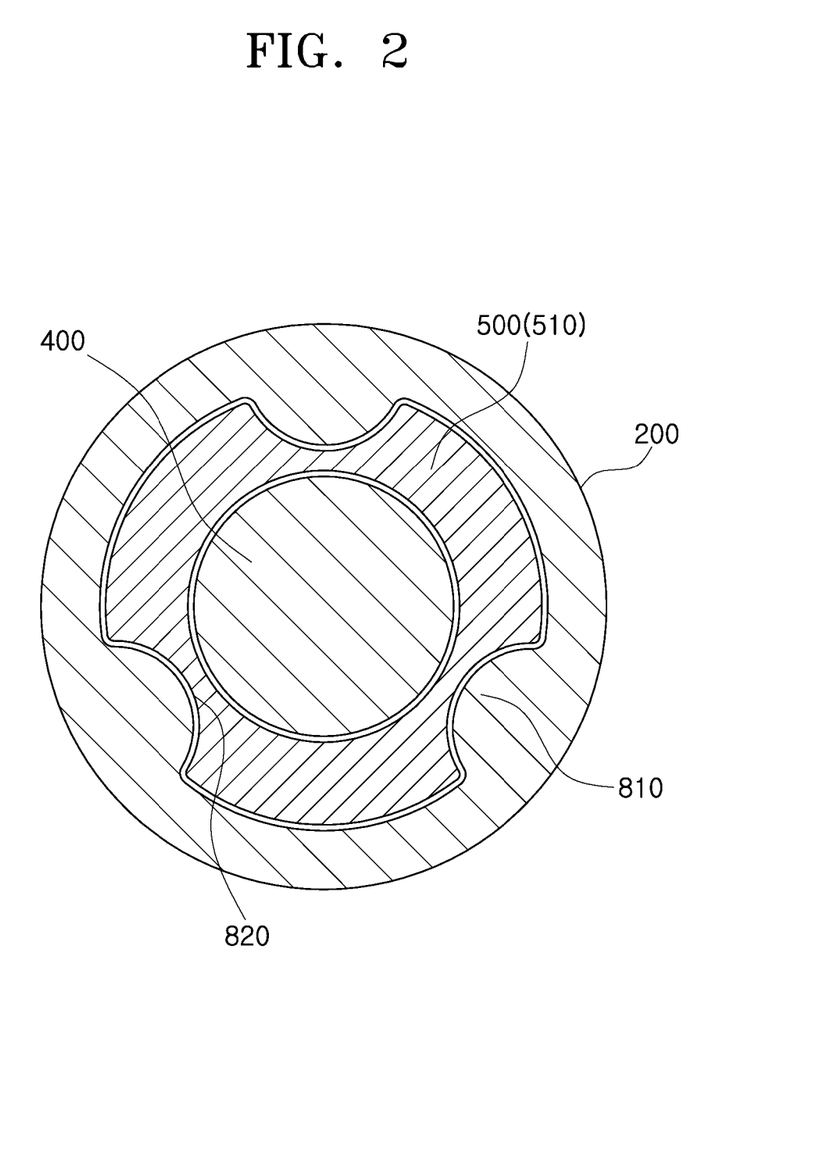
FIG. 2 is a cross-sectional view taken along line A-A of FIG. 1 for explaining a first embodiment of a guide unit in the brake device for a vehicle according to an embodiment of the present disclosure.

Referring to FIG. 2, as an embodiment of the guide unit 800, the guide unit 800 may include a first guide protrusion portion 810 protruding from the inner surface of the cylinder unit 200 and a first guide groove portion 820 recessed in the outer surface of the nut unit 500 to correspond to the first guide protrusion portion 810. Accordingly, the nut unit 500 is moved in a straight line along the first guide protrusion portion 810. In another embodiment, the first guide groove portion 820 may be recessed in the outer surface of the flange unit 510 to correspond to the first guide protrusion portion 810. Accordingly, the flange unit 510 is moved in a straight line along the first guide protrusion portion 810.

Figure 3:
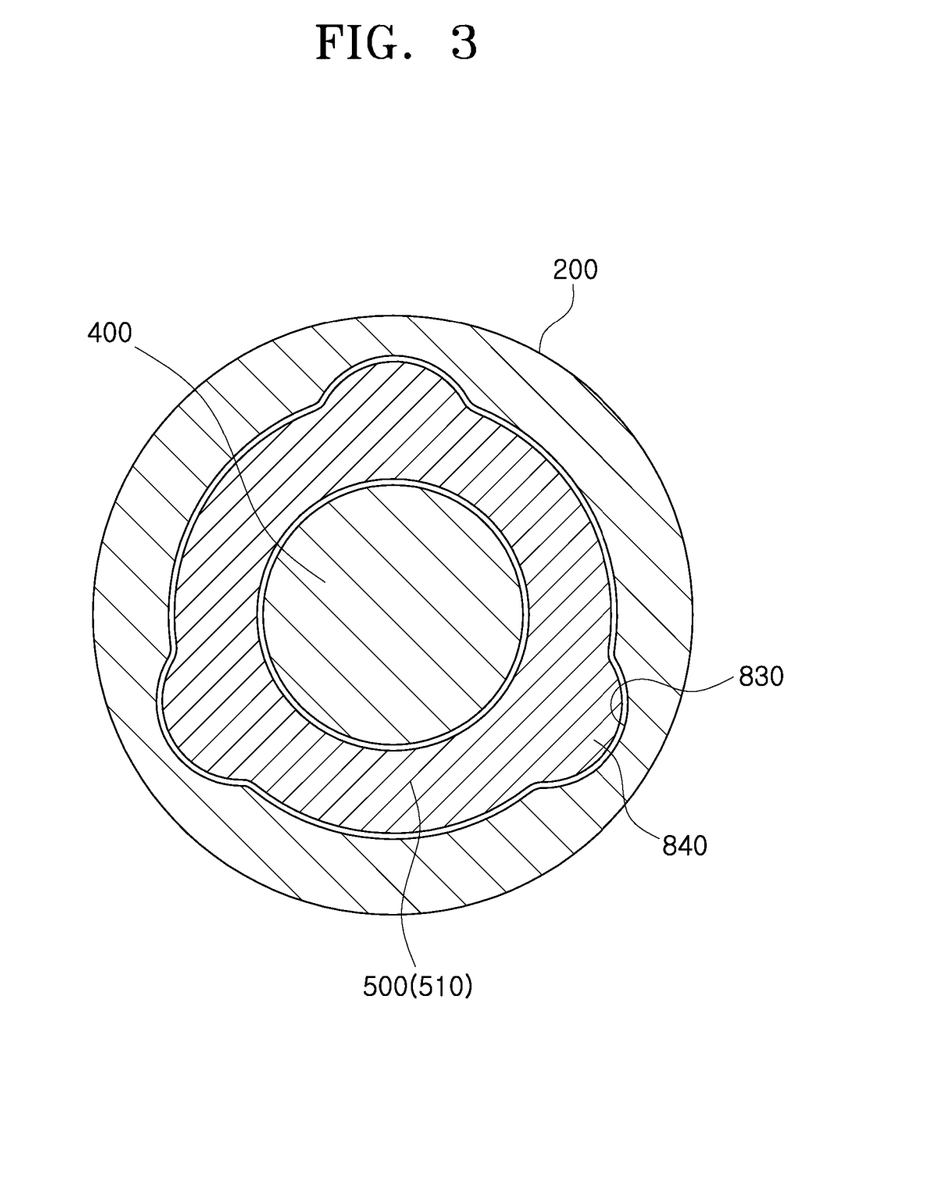
FIG. 3 is a cross-sectional view taken along line A-A of FIG. 1 for explaining a second embodiment of the guide unit in the brake device for a vehicle according to an embodiment of the present disclosure.

Referring to FIG. 3, as an embodiment of the guide unit 800, the guide unit 800 may include a second guide groove portion 830 recessed in the inner surface of the cylinder unit 200 and a second guide protrusion portion 840 protruding from the outer surface of the nut unit 500 to correspond to the second guide groove portion 830. Accordingly, the nut unit 500 is moved in a straight line along the second guide groove portion 830. In another embodiment, the second guide protrusion portion 840 may protrude from the outer surface of the flange unit 510 to correspond to the second guide groove portion 830. Accordingly, the flange unit 510 is moved in a straight line along the second guide groove portion 830.

Figure 4:
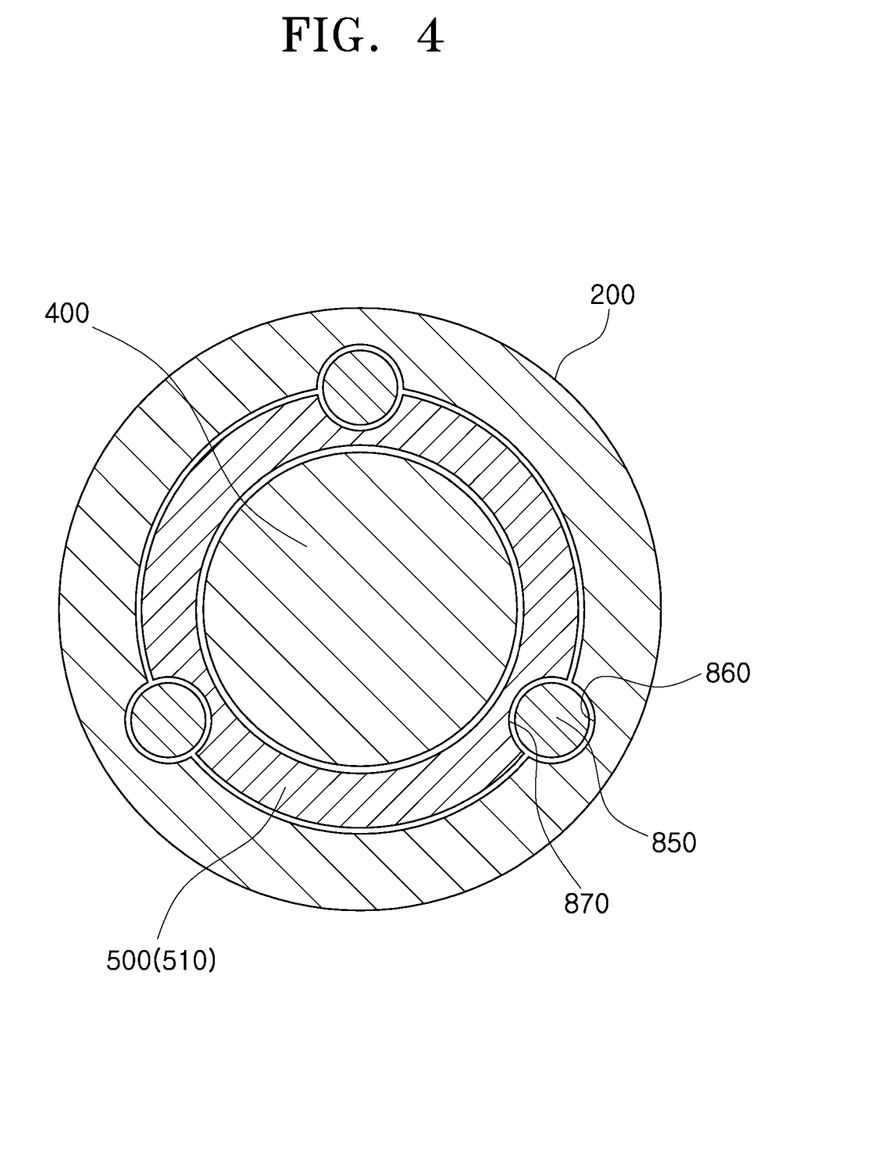
FIG. 4 is a cross-sectional view taken along line A-A of FIG. 1 for explaining a third embodiment of the guide unit in the brake device for a vehicle according to an embodiment of the present disclosure.

Referring to FIG. 4, as an embodiment of the guide unit 800, the guide unit 800 may be inserted between the cylinder unit 200 and the nut unit 500, and may configure to include a guide member 850 that guides the linear movement of the nut unit 500 by restraining the rotation of the nut unit 500. The guide member 850 may have the shape of a rod with a predetermined length of a circular and elliptical cross-section, and may have the shape of a bar with a predetermined length having an angled polygonal cross-section.

In this case, the cylinder unit 200 may be provided with a third guide groove portion 860 recessed on the inner surface, and the nut unit 500 may be provided with a fourth guide groove portion 870 recessed on the outer surface to correspond to the third guide groove portion 860. The guide member 850 is located between the third guide groove portion 860 and the fourth guide groove portion 870, and the nut unit 500 is moved in a straight line along the guide member 850. In another embodiment, the fourth guide groove portion 870 may be recessed in the outer surface of the flange unit 510 to correspond to the third guide groove portion 860. Accordingly, the flange unit 510 is linearly moved along the guide member 850.

The bearing unit 900 is located inside the housing unit 100 and is provided at the inner end portion of the cylinder unit 200. An outer surface of the bearing unit 900 and an outer surface of the sleeve unit 700 are installed in contact with each other. The bearing unit 900 is combined with the screw shaft 400 in the form of enclosing a second coupling portion 430 of the screw shaft 400.

An inner ring portion 910 of the bearing unit 900 is in contact with the second coupling portion 430 of the screw shaft 400, and an outer ring portion 920 is installed in contact with the inner surface of the cylinder unit 200. The bearing unit 900 supports an axial load by the piston unit 600 which reciprocates in the axial direction of the screw shaft 400 when hydraulic pressure is formed inside the cylinder unit 200.

The support unit 1000 is provided inside the cylinder unit 200. An end portion of the second coupling portion 430 is accommodated inside the support unit 1000. The bearing unit 900 is fixed to an outer circumferential surface of an opening of the support unit 1000. The support unit 1000 rotatably supports the screw shaft 400.

An operation process of the brake device for a vehicle according to an embodiment of the present disclosure having the above-described configuration will be described below.

Figure 5:
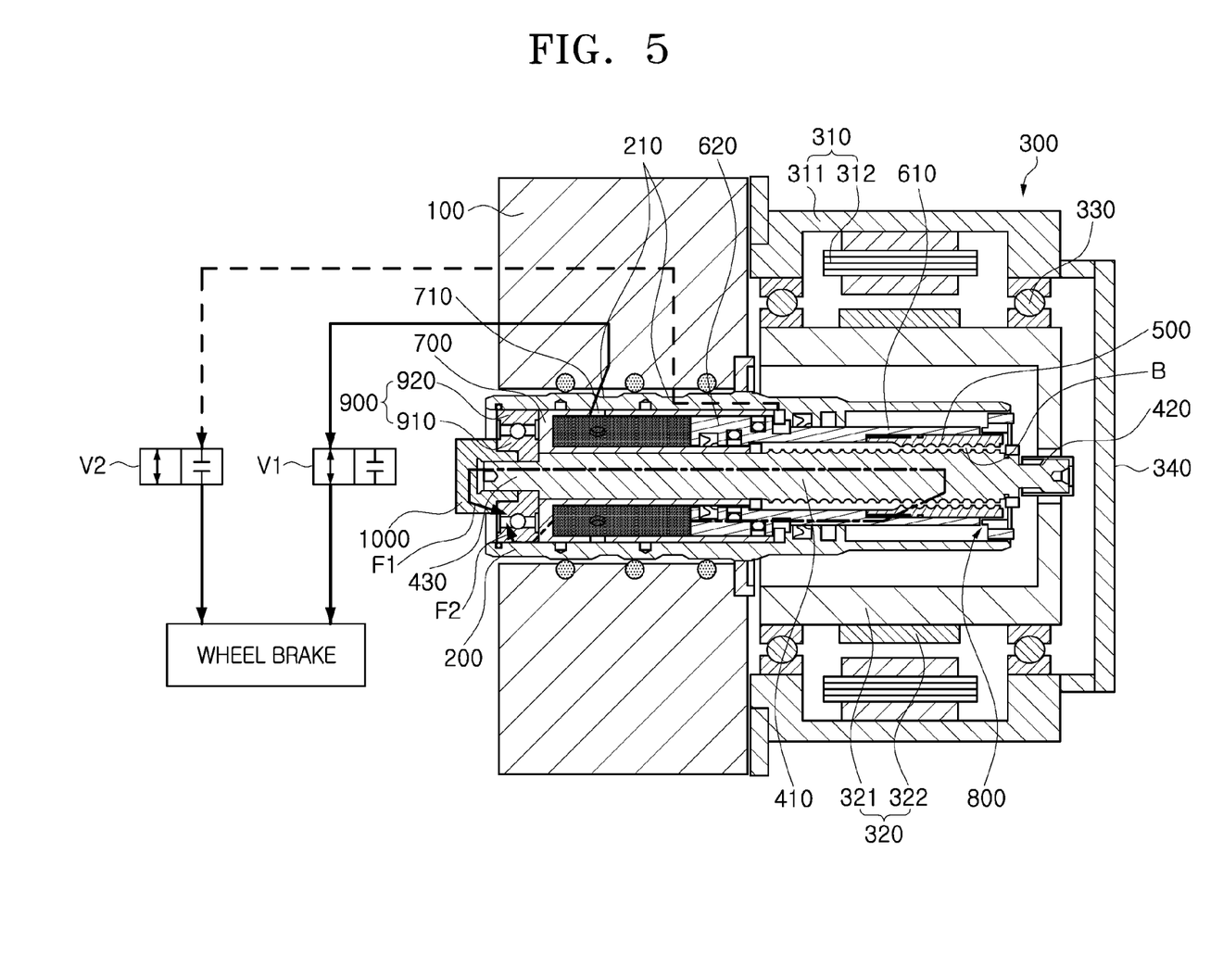
FIG. 5 is a cross-sectional view illustrating a state in which hydraulic pressure is generated on one side of the head unit of a piston unit in the brake device for a vehicle according to an embodiment of the present disclosure.

FIG. 5 is a cross-sectional view illustrating a state in which hydraulic pressure is generated on one side of the head unit of the piston unit in the brake device for a vehicle according to an embodiment of the present disclosure.

Referring to FIG. 5, in a state that a first valve V1 connected to the cylinder port 210 provided on one side of the cylinder unit 200 is opened, and a second valve V2 connected to the cylinder port 210 provided on the other side of the cylinder unit 200 is closed, hydraulic pressure is formed on one side (left side based on FIG. 5) of the head unit 620 of the piston unit 600 to be transferred to a wheel brake.

Pressure formed by hydraulic pressure creates a reaction force to move the head unit 620 to the other side of the cylinder unit 200 (right side based on FIG. 5), and the force is transmitted in the order of the head unit 620, the rod unit 610, the nut unit 500, the body portion 410, the second coupling portion 430, the support unit 1000, and the inner ring portion 910, and then a first force F1 is formed. In addition, a load formed by hydraulic pressure is transmitted in the order of the sleeve unit 700 and the outer ring portion 920, forming a second force F2.

At this time, since the hydraulic pressure operating areas of the first force F1 and the second force F2 are the same (F1=F2), an axial load caused by hydraulic pressure formation balances a force between the inner ring portion 910 and the outer ring portion 920 of the bearing unit 900 inside the cylinder unit 200. Accordingly, since the axial load is not transmitted to the outside, the axial load is not applied to the motor unit 300.

Figure 6:
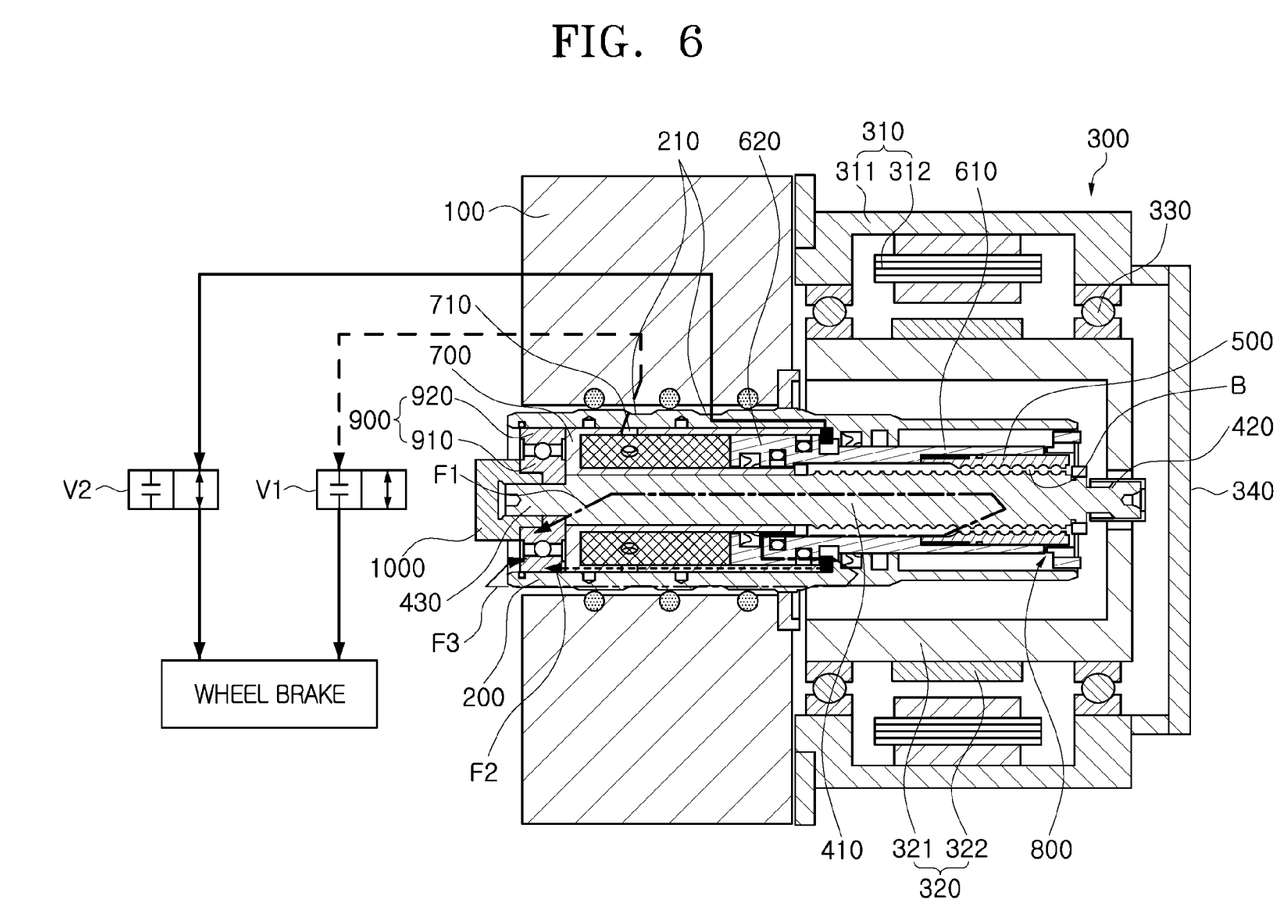
FIG. 6 is a cross-sectional view illustrating a state in which hydraulic pressure is generated on the other side of the head unit of the piston unit in the brake device for a vehicle according to an embodiment of the present disclosure.

FIG. 6 is a cross-sectional view illustrating a state in which hydraulic pressure is generated on the other side of the head unit of the piston unit in the brake device for a vehicle according to an embodiment of the present disclosure.

Referring to FIG. 6, in a state that the first valve V1 connected to the cylinder port 210 provided on one side of the cylinder unit 200 is closed, and the second valve V2 connected to the cylinder port 210 provided on the other side of the cylinder unit 200 is opened, hydraulic pressure is formed on the other side (right side based on FIG. 6) of the head unit 620 of the piston unit 600 to be transferred to the wheel brake.

Pressure formed by hydraulic pressure creates a reaction force to move the head unit 620 to the other side of the cylinder unit 200 (left side based on FIG. 6), and the force is transmitted in the order of the head unit 620, the rod unit 610, the nut unit 500, the body portion 410, and the inner ring portion 910, and then the first force F1 is formed, the force is transmitted in the order of the sleeve unit 700 and the outer ring portion 920 to form the second force F2. In addition, a load formed by hydraulic pressure is transmitted in the order of the cylinder unit 200 and the outer ring portion 920, forming a third force F3.

At this time, since the sum of the hydraulic operating areas of the first force F1 and the second force F2 is the same as the hydraulic operating area of the third force F3 (F1+F2=F3), the axial load caused by hydraulic formation balances the force between the inner ring portion 910 and the outer ring portion 920 of the bearing unit 900 inside the cylinder unit 200. Accordingly, since the axial load is not transmitted to the outside, the axial load is not applied to the motor unit 300.

Figure 7:
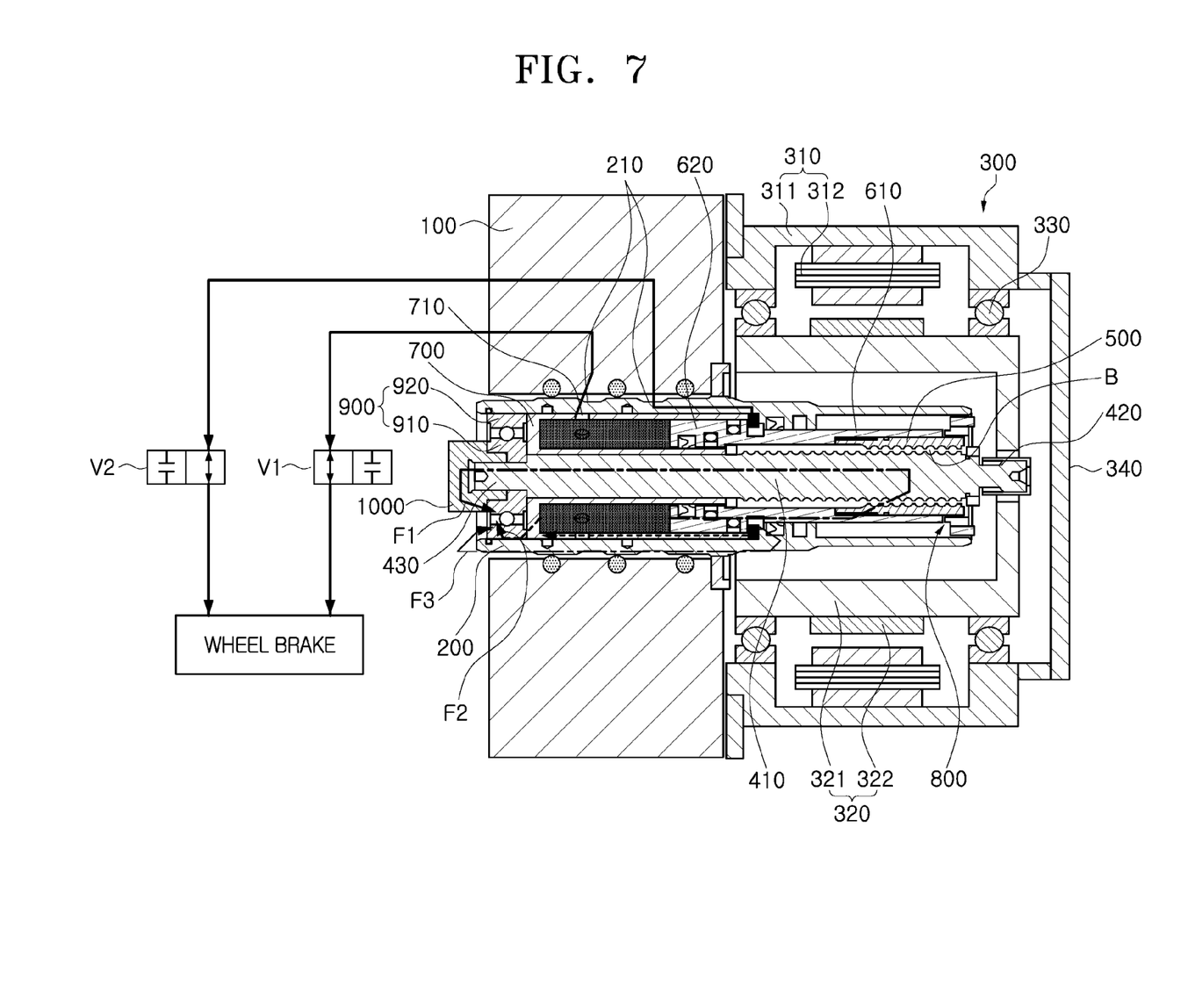
FIG. 7 is a cross-sectional view illustrating a state in which hydraulic pressure is generated on both sides of the head unit of the piston unit in the brake device for a vehicle according to an embodiment of the present disclosure.

FIG. 7 is a cross-sectional view illustrating a state in which hydraulic pressure is generated on both sides of the head unit of the piston unit in the brake device for a vehicle according to an embodiment of the present disclosure.

Referring to FIG. 7, in a state that the first valve V1 connected to the cylinder port 210 provided on one side of the cylinder unit 200 is opened, and the second valve V2 connected to the cylinder port 210 provided on the other side of the cylinder unit 200 is also opened, and hydraulic pressure is formed on both sides of the head unit 620 of the piston unit 600 to be transmitted to the wheel brake.

The pressure formed by the hydraulic pressure in the sleeve unit 700 located on one side of the head unit 620 (left side based on FIG. 7) forms a reaction force to move the head unit 620 to the other side of the cylinder unit 200 (right side based on FIG. 7), and the force is transmitted in the order of the head unit 620, the rod unit 610, the nut unit 500, the body portion 410, the second coupling portion 430, the support unit 1000, and the inner ring portion 910 to form the first force F1, and the pressure formed by the hydraulic pressure in the sleeve unit 700 located on the other side of the head unit 620 (right side based on FIG. 7) forms a reaction force to move the head unit 620 to one side of the cylinder unit 200 (left side based on FIG. 7), the force is transmitted in the order of the cylinder unit 200 and the outer ring portion 920 to form the third force F3. In addition, a load formed by hydraulic pressure is transmitted in the order of the sleeve unit 700 and the outer ring portion 920, forming a second force F2.

At this time since the sum of the hydraulic pressure operating areas of the first force F1 and the third force F3 is equal to the hydraulic pressure operating area of the second force F2 (F1+F3=F2), the axial load caused by hydraulic pressure formation is balanced between the bearing unit 900 and the outer ring portion 920. Accordingly, since the axial load is not transmitted to the outside, the axial load is not applied to the motor unit 300.

The brake device for a vehicle according to an embodiment of the present disclosure may support the axial load according to the reaction force in both directions through the bearing unit 900 coupled to the cylinder unit 200 during hydraulic pressure formation, so that the axial load by hydraulic pressure is not transmitted to the motor unit 300.

Since the brake device for a vehicle according to an embodiment of the present disclosure does not support an axial load in the motor unit 300, weight and size of the housing unit 100 and the bearing unit 900 may be reduced.

The brake device for a vehicle according to an embodiment of the present disclosure may reduce cost and an axial length by omitting existing axial alignment assembly single products using right angle and concentric compensation using an own gap of the bearing unit 900.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake device for a vehicle, comprising:
a housing unit having first and second surfaces respectively facing in mutually opposite directions and respectively having first and second openings with a through-hole extending therebetween;
a motor unit disposed on the first surface of the housing unit and configured to provide a rotational force;
a cylinder unit longitudinally extending from within the motor unit into the through-hole of the housing unit, the cylinder unit having a first end portion surrounded by the motor unit and a second end portion protruding outwardly from the second surface of the housing unit via the second opening of the housing unit;
a bearing unit disposed in the second end portion of the cylinder unit;
a screw shaft disposed within the cylinder unit and configured to axially rotate in response to receiving the rotational force from the motor unit, the screw shaft having a first coupling portion coupled to the motor unit, a second coupling portion coupled to the bearing unit, and a body portion longitudinally extending between the first and second coupling portions;
a nut unit coupled to the screw shaft through a ball member and configured to reciprocate in an axial direction of the screw shaft in response to receiving axial rotating of the screw shaft; and
a piston unit coupled to the nut unit and configured to move in conjunction with the nut unit,
wherein the bearing unit supports an axial load by the piston unit during hydraulic pressure formation of the cylinder unit.

2. The brake device of claim 1, further comprising a sleeve unit disposed within the cylinder unit and configured to guide a movement of the piston unit.

3. The brake device of claim 2, wherein:
the cylinder unit has, on an outer surface thereof, a port through which a working oil moves, and
the sleeve unit has, on an outer surface thereof, a cut-off hole portion configured to communicate with the port.

4. The brake device of claim 3, wherein the cylinder unit is configured to generate a double-acting hydraulic pressure according to a reciprocating movement of the piston unit.

5. The brake device of claim 3, wherein the piston unit comprises:
a rod unit spirally coupled to the nut unit; and
a head unit configured to reciprocate within the sleeve unit in a longitudinal direction of the sleeve unit.

6. The brake device of claim 1, further comprising;
a guide unit provided inside the cylinder unit for restraining a rotation of the nut unit and guiding a linear movement of the nut unit.

7. The brake device of claim 6, wherein the guide unit is integrally molded into the cylinder unit or the nut unit.

8. The brake device of claim 6, wherein:
the guide unit comprises a first guide protrusion portion protruding from an inner surface of the cylinder unit and a first guide groove portion recessed in an outer surface of the nut unit to correspond to the first guide protrusion portion, and
the nut unit is movable in a straight line along the first guide protrusion portion.

9. The brake device of claim 6, wherein:
the guide unit comprises a second guide groove portion recessed in an inner surface of the cylinder unit and a second guide protrusion portion protruding from an outer surface of the nut unit to correspond to the second guide groove portion, and
the nut unit is movable in a straight line along the second guide groove portion.

10. The brake device of claim 6, wherein the guide unit comprises a guide member inserted between the cylinder unit and the nut unit, and guides the linear movement of the nut unit by restraining the rotation of the nut unit.

11. The brake device of claim 10, wherein:
the guide unit comprises a third guide groove portion recessed in an inner surface of the cylinder unit and a fourth guide groove portion recessed in an outer surface of the nut unit to correspond to the third guide groove portion, and
the guide member is positioned between the third guide groove portion and the fourth guide groove portion.

12. The brake device of claim 1, wherein the motor unit comprises:
a fixing unit fixed to the housing unit and changing a magnetic force thereof by supplying power;
a motor rotation unit connected to the screw shaft, rotated with the screw shaft, and rotated in response to a magnetic force change of the fixing unit; and
a motor bearing unit installed between the fixing unit and the motor rotation unit to reduce friction generated when the motor rotation unit is rotated.

13. The brake device of claim 12, wherein the motor rotation unit comprises:
a rotating frame rotatably installed inside the fixing unit and surrounding the first end portion of the cylinder unit; and
a rotor installed on an outer surface of the rotating frame facing the fixing unit and reactive to the magnetic force.

14. The brake device of claim 13, wherein the screw shaft comprises: the body portion rotatably installed inside the cylinder unit and having a spiral gear on an outer surface of the body portion;

the first coupling portion extending to one side from the body portion and spline-coupled to the rotating frame; and the second coupling portion extending from the body portion from an other side of the body portion and rotatably coupled to the bearing unit.

15. The brake device of claim 14, further comprising:

a support unit provided inside the cylinder unit, accommodating an end portion of the second coupling portion, and rotatably supporting the screw shaft.

* * * * *